(12) United States Patent
Nakada et al.

(10) Patent No.: US 11,981,574 B2
(45) Date of Patent: May 14, 2024

(54) FINE SILICON PARTICLES AND PRODUCTION METHOD THEREOF

(71) Applicant: MITSUBISHI MATERIALS CORPORATION, Tokyo (JP)

(72) Inventors: Yoshinobu Nakada, Ageo (JP); Naoki Rikita, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/783,199

(22) PCT Filed: Dec. 2, 2020

(86) PCT No.: PCT/JP2020/044776
§ 371 (c)(1),
(2) Date: Jun. 7, 2022

(87) PCT Pub. No.: WO2021/117567
PCT Pub. Date: Jun. 17, 2021

(65) Prior Publication Data
US 2023/0025365 A1    Jan. 26, 2023

(30) Foreign Application Priority Data
Dec. 10, 2019    (JP) .................... 2019-223082

(51) Int. Cl.
*C01B 33/02* (2006.01)
*B02C 17/04* (2006.01)

(52) U.S. Cl.
CPC .............. *C01B 33/02* (2013.01); *B02C 17/04* (2013.01); *C01P 2004/54* (2013.01);
(Continued)

(58) Field of Classification Search
None
See application file for complete search history.

(56) References Cited

U.S. PATENT DOCUMENTS

| | | | |
|---|---|---|---|
| 6,019,667 A | 2/2000 | Bush et al. | |
| 2015/0072240 A1 | 3/2015 | Yoo et al. | |

(Continued)

FOREIGN PATENT DOCUMENTS

| | | |
|---|---|---|
| CN | 101039747 A | 9/2007 |
| CN | 105210217 A | 12/2015 |

(Continued)

OTHER PUBLICATIONS

International Search Report issued in PCT/JP2020/044776, dated Feb. 2, 2021.

(Continued)

*Primary Examiner* — Ronak C Patel
(74) *Attorney, Agent, or Firm* — Locke Lord LLP; James E. Armstrong, IV; Nicholas J. DiCeglie, Jr.

(57) ABSTRACT

The present invention provides a fine silicon powder and the like including fine silicon particles having a microscopically measured particle diameter of 1 μm or more and an average circularity determined in accordance with Formula (1) of 0.93 or more, in which an average particle diameter based on volume, which is measured by a laser diffraction scattering method, is in a range of 0.8 μm or more and 8.0 μm or less, an average particle diameter based on number, which is measured by the laser diffraction scattering method, is in a range of 0.100 μm or more and 0.150 μm or less, and a specific surface area, which is measured by a BET method, is in a range of 4.0 m²/g or more and 10 m²/g or less. Circularity=(4×π×projected area of particle)$^{1/2}$/peripheral length of particle (1).

4 Claims, 3 Drawing Sheets

(52) U.S. Cl.
    CPC ...... *C01P 2004/61* (2013.01); *C01P 2004/62* (2013.01); *C01P 2006/12* (2013.01); *C01P 2006/40* (2013.01)

(56) References Cited

U.S. PATENT DOCUMENTS

| | | | |
|---|---|---|---|
| 2016/0190552 A1* | 6/2016 | Murata | H01M 4/134 |
| | | | 429/231.8 |
| 2016/0190554 A1 | 6/2016 | Watanabe | |
| 2018/0212234 A1* | 7/2018 | Haufe | H01M 4/622 |
| 2019/0386314 A1* | 12/2019 | Lanning | H01M 10/0565 |

FOREIGN PATENT DOCUMENTS

| | | |
|---|---|---|
| CN | 105712350 A | 6/2016 |
| CN | 106536408 A | 3/2017 |
| CN | 107710467 A | 2/2018 |
| JP | H06-016411 A | 1/1994 |
| JP | 2000-024541 A | 1/2000 |
| JP | 2011-132105 A | 7/2011 |
| JP | 2012-256543 A | 12/2012 |
| JP | 2014-519135 A | 8/2014 |
| JP | 2014-528893 A | 10/2014 |
| JP | 2016-073919 A | 5/2016 |
| JP | 2018-065722 A | 4/2018 |
| JP | 2018-530859 A | 10/2018 |
| WO | 2011/058317 A1 | 5/2011 |
| WO | 2013/025707 A1 | 2/2013 |
| WO | 2013/164914 A1 | 11/2013 |

OTHER PUBLICATIONS

Office Action dated Jun. 1, 2023, issued for CN202080084847.6 and English translation thereof.
European Search Report issued in EP 20898140.7, dated Dec. 11, 2023.

* cited by examiner

FINE SILICON PARTICLES AND PRODUCTION METHOD THEREOF

TECHNICAL FIELD

The present invention relates to fine silicon particles and a production method thereof.

Priority is claimed on Japanese Patent Application No. 2019-223082 filed in Japan on Dec. 10, 2019, the content of which is incorporated herein by reference.

BACKGROUND ART

Fine silicon particles are used as Si raw materials for silicide-based thermoelectric materials such as $Mg_2Si$, for example. In addition, fine silicon particles are also used as negative-electrode active materials for lithium-ion secondary batteries, silicide target raw materials, and materials for luminescent materials in which luminescent organic molecules are adsorbed on fine silicon particles to create enhanced luminescence. Fine silicon particles are generally produced by milling coarse silicon particles.

Patent Document 1 describes a method for producing high-purity, tiny, fine silicon particles by applying pressure to lumps of silicon to generate microcracks and then carrying out milling thereon. In Patent Document 1, a ball mill is described as an apparatus for milling lumps of silicon.

Patent Document 2 describes silicon particles having a volume-weighted particle size distribution with a diameter percentile $d_{50}$ of 0.5 μm to 10.0 μm as a negative-electrode active material for lithium-ion secondary batteries. Patent Document 2 describes a milling process as a method for producing silicon particles. Planetary ball mills, jet mills, opposed jet mills, impact mills, and agitating ball mills are described as apparatuses for the milling process.

CITATION LIST

Patent Documents

[Patent Document 1]
Japanese Unexamined Patent Application, First Publication No. H6-16411
[Patent Document 2]
Published Japanese Translation No. 2018-530859 of the PCT International Publication

SUMMARY OF INVENTION

Technical Problem

To improve the thermoelectric efficiency of silicide-based thermoelectric materials, such as $Mg_2Si$, improving the composition uniformity is being considered. Since silicide-based thermoelectric materials have a high melting point of Si, a low melting point of other raw materials, and a high vapor pressure, there is a method for carrying out the production by mixing fine silicon particles, which are the Si raw material, with other raw material particles and sintering the obtained particle mixture at the melting point of Si or lower. At this time, in order to obtain a silicide-based thermoelectric material with high composition uniformity, fine silicon particles that are tiny, that are less likely to form coarse agglomerated particles, and that have high dispersibility when mixed with other raw material particles are necessary. However, the fine silicon particles produced using the methods described in Patent Document 1 and Patent Document 2 tend to be relatively angularly shaped. Angularly shaped fine silicon particles tend to form coarse agglomerated particles and have low dispersibility when mixed with other raw material particles.

The present invention was created in view of the circumstances described above and has an object of providing fine silicon particles that are tiny, that are less likely to form coarse agglomerated particles, and that have high dispersibility when mixed with other raw material particles, as well as a production method thereof.

Solution to Problem

In order to solve the above problem, fine silicon particles of the present invention include particles having a microscopically measured particle diameter of 1 μm or more, in which an average particle diameter based on volume, which is measured by a laser diffraction scattering method, is in a range of 0.8 μm or more and 8.0 μm or less, an average particle diameter based on number, which is measured by the laser diffraction scattering method, is in a range of 0.100 μm or more and 0.150 μm or less, a specific surface area, which is measured by a BET method, is in a range of 4.0 $m^2/g$ or more and 10 $m^2/g$ or less, and the particles having a microscopically measured particle diameter of 1 μm or more have an average circularity determined in accordance with Formula (1) of 0.93 or more.

$$\text{Circularity} = (4 \times \pi \times \text{projected area of particle})^{1/2} / \text{peripheral length of particle} \quad (1)$$

The fine silicon particles of the present invention configured as described above are tiny since the average particle diameter based on volume, which is measured by the laser diffraction scattering method, is in a range of 0.8 μm or more and 8.0 μm or less and the average particle diameter based on number, which is measured by the laser diffraction scattering method, is in a range of 0.100 μm or more and 0.150 μm or less. Thus, by mixing these fine silicon particles with other raw material particles, it is possible to obtain a particle mixture with a uniform composition.

In addition, the fine silicon particles of the present invention have a specific surface area, which is measured by the BET method, in a range of 4.0 $m^2/g$ or more and 10 $m^2/g$ or less, thus, while the reactivity is maintained, coarse agglomerated particles are less likely to form. Thus, it is possible to uniformly disperse the fine silicon particles as primary particles or tiny agglomerated particles close thereto in a particle mixture with other raw material particles.

Furthermore, the fine silicon particles of the present invention have high fluidity since the average circularity of the particles having a microscopically measured particle diameter of 1 μm or more is 0.93 or more and the particle shape is close to spherical. Thus, the dispersibility of the fine silicon particles is improved when mixed with other raw material particles.

Here, in the fine silicon particles of the present invention, preferably, in a particle size distribution based on volume, which is measured by the laser diffraction scattering method, a particle diameter D10 with a cumulative frequency of 10% by volume is 0.160 μm or less, a particle diameter D50 with a cumulative frequency of 50% by volume is 0.600 μm or less, and a particle diameter D90 with a cumulative frequency of 90% by volume is 20 μm or less.

In such a case, for the particle size distribution, the fine silicon particles have a narrow particle diameter distribution range for relatively tiny particles and a wide particle diameter distribution range for relatively large particles, thus, the dispersibility and filling properties are improved. Thus, it is possible to obtain a particle mixture with a uniform composition by mixing with other raw material particles.

In addition, in the fine silicon particles of the present invention, the particles having a microscopically measured particle diameter of 1 μm or more preferably have an average aspect ratio of 1.33 or less.

In such a case, the entanglement of the fine silicon particles with each other is suppressed when mixed with other raw material particles, thus, the dispersibility of the fine silicon particles is further improved.

Furthermore, in the fine silicon particles of the present invention, the particles having a microscopically measured particle diameter of 1 μm or more preferably have an average degree of unevenness determined in accordance with Formula (2) of 0.96 or more.

$$\text{Degree of unevenness} = \text{Envelope peripheral length of particles/peripheral length of particles} \quad (2)$$

In such a case, the contact area between the fine silicon particles is reduced and coarse agglomerated particles are less likely to form. Thus, it is possible to more uniformly disperse the fine silicon particles as primary particles or tiny agglomerated particles close thereto in a particle mixture with other raw material particles.

Furthermore, in the fine silicon particles of the present invention, the residual strain is preferably 0.0300% or more.

In such a case, since the strain of the Si fine particles is large, by being mixed with other raw materials and sintered, the other raw materials easily diffuse into the Si fine particles and the composition uniformity in the obtained sintered product is high.

In addition, other fine silicon particles of the present invention include particles having a microscopically measured particle diameter of 1 μm or more, in which, in a particle size distribution based on volume, which is measured by the laser diffraction scattering method, a particle diameter D10 with a cumulative frequency of 10% by volume is 0.160 μm or less, a particle diameter D50 with a cumulative frequency of 50% by volume is 0.600 μm or less, and a particle diameter D90 with a cumulative frequency of 90% by volume is 20 μm or less, a specific surface area, which is measured by the BET method, is in a range of 4.0 m$^2$/g or more and 10 m$^2$/g or less, and the particles having a microscopically measured particle diameter of 1 μm or more have an average circularity determined in accordance with Formula (1) of 0.93 or more.

$$\text{Circularity} = (4 \times \pi \times \text{projected area of particle})^{1/2}/\text{peripheral length of particle} \quad (1)$$

The fine silicon particles of the present invention configured as described above have a particle size distribution with a narrow particle diameter distribution range for relatively tiny particles that account for a large number of particles by volume and a wide particle diameter distribution range for relatively large particles that account for a small number of particles by volume, thus, the dispersibility and filling properties are improved. Thus, it is possible to obtain a particle mixture with a uniform composition by mixing with other raw material particles.

A method for producing fine silicon particles of the present invention includes a step of preparing coarse silicon particles with a maximum particle diameter of 1000 μm or less, which are classified by a sieve method, and a milling step of filling a container filled with a non-oxidizing gas with the coarse silicon particles and hard balls having a particle diameter in a range of 1 mm or more and 10 mm or less and rotating the container using a three-dimensional ball mill apparatus to mill the coarse silicon particles for 30 minutes or longer, in which, in the milling step, an amount of the hard balls with respect to 100 parts by mass of the coarse silicon particles is in a range of 500 parts by mass or more and 2500 parts by mass or less and, in the milling step, a total volume of the coarse silicon particles and the hard balls with respect to a capacity of the container is in a range of 3% or more and 35% or less.

The method for producing fine silicon particles of the present invention configured as described above uses coarse silicon particles with a maximum particle diameter of 1000 μm or less, which are sorted by the sieve method, thus, coarse particles are unlikely to be mixed into the obtained fine silicon particles. In addition, since balls with a comparatively large particle diameter with a particle diameter in a range of 1 mm or more and 10 mm or less are used as the hard balls at a ratio in a range of 500 parts by mass or more and 2500 parts by mass or less with respect to 100 parts by mass of the coarse silicon particles described above, it is possible to reliably mill the coarse silicon particles. Furthermore, since a container filled with non-oxidizing gas is used, it is possible to suppress particle agglomeration and oxidation of the fine silicon particles due to moisture absorption of the fine silicon particles. Furthermore, since the filling ratio of coarse silicon particles and hard balls in the container is in a range of 3% or more and 35% or less as the amount of the total volume of coarse silicon particles and hard balls with respect to the capacity of the container, it is possible to mill the coarse silicon particles more reliably. Furthermore, since the milling is carried out for 0.5 hours or more using a three-dimensional ball mill apparatus, the obtained fine silicon particles are less likely to be angular in shape. Thus, according to the method for producing fine silicon particles, it is possible to industrially produce, in an advantageous manner, fine silicon particles that are tiny, that are less likely to form coarse agglomerated particles, and that have high dispersibility when mixed with other raw material particles.

Advantageous Effects of Invention

According to the present invention, it is possible to provide fine silicon particles that are tiny, that are less likely to form coarse agglomerated particles, and that have high dispersibility when mixed with other raw material particles, as well as a production method thereof.

DESCRIPTION OF EMBODIMENTS

Figure 1:
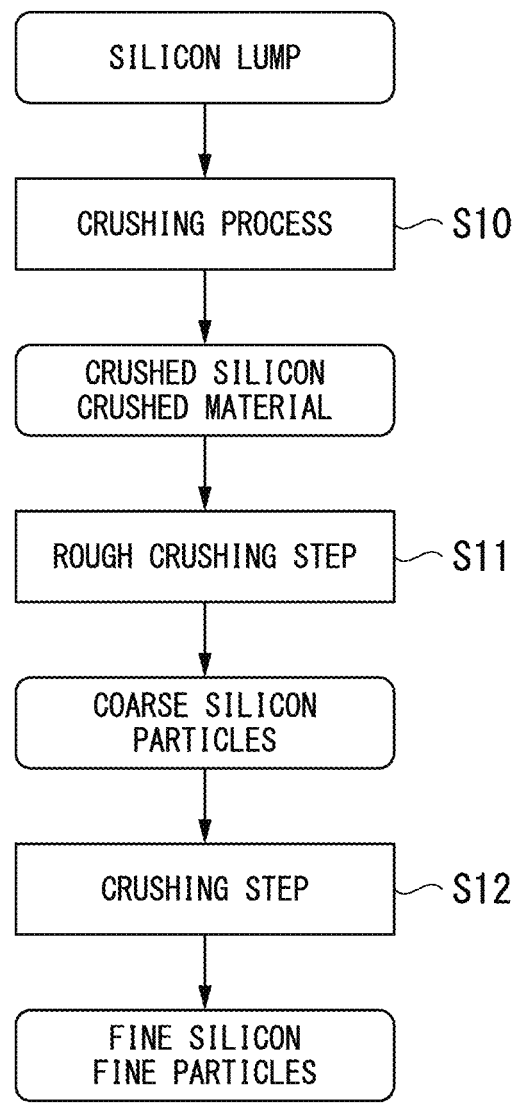
FIG. 1 is a flow of a method for producing fine silicon particles according to one embodiment of the present invention.

A description will be given below of the fine silicon particles of one embodiment of the present invention and a production method thereof, with reference to the accompanying drawings.

[Fine Silicon Particles]

The fine silicon particles according to one embodiment of the present invention include particles having a microscopically measured particle diameter of 1 μm or more, in which an average particle diameter based on volume, which is measured by a laser diffraction scattering method, is in a range of 0.8 μm or more and 8.0 μm or less, an average particle diameter based on number, which is measured by the laser diffraction scattering method, is in a range of 0.100 μm or more and 0.150 μm or less, a specific surface area, which is measured by the BET method, is in a range of 4.0 m$^2$/g or more and 10 m$^2$/g or less, and the particles having a microscopically measured particle diameter of 1 μm or more have an average circularity determined in accordance with Formula (1) of 0.93 or more.

$$\text{Circularity} = (4 \times \pi \times \text{projected area of particle})^{1/2} / \text{peripheral length of particle} \quad (1)$$

In the fine silicon particles according to the present embodiment, in a particle size distribution based on volume, which is measured by the laser diffraction scattering method, preferably, a particle diameter D10 with a cumulative frequency of 10% by volume is 0.160 μm or less, a particle diameter D50 with a cumulative frequency of 50% by volume is 0.600 μm or less, and a particle diameter D90 with a cumulative frequency of 90% by volume is 20 μm or less.

The fine silicon particles according to another embodiment of the present invention include particles having a microscopically measured particle diameter of 1 μm or more, in which, in a particle size distribution based on volume, which is measured by the laser diffraction scattering method, a particle diameter D10 with a cumulative frequency of 10% by volume is 0.160 μm or less, a particle diameter D50 with a cumulative frequency of 50% by volume is 0.600 μm or less, and a particle diameter D90 with a cumulative frequency of 90% by volume is 20 μm or less, a specific surface area, which is measured by the BET method, is in a range of 4.0 m$^2$/g or more and 10 m$^2$/g or less, and the particles having a microscopically measured particle diameter of 1 μm or more have an average circularity determined in accordance with Formula (1) of 0.93 or more.

$$\text{Circularity} = (4 \times \pi \times \text{projected area of particle})^{1/2} / \text{peripheral length of particle} \quad (1)$$

The fine silicon particles according to an embodiment of the present invention preferably include 5% to 30% particles having a microscopically measured particle diameter of 1 μm or more, more preferably include 5% to 25%, and particularly preferably include 5% to 20%. Microscopy is a method for capturing enlarged images of fine silicon particles using a microscope and measuring the size of the fine silicon particles from the obtained enlarged images. Particles with a particle diameter of 1 μm or more are particles where the maximum length of the particles as measured from the enlarged image of the fine silicon particles is 1 μm or more.

In addition, in Formula (1), the projected area of a particle is the projected area of the particle as measured from an enlarged image of the fine silicon particles. The peripheral length of the particle is the length of a projected contour line of the particle as measured from an enlarged image of the fine silicon particles. The average circularity is the average circularity of 10000 particles.

In addition, for the particles with a particle diameter of 1 μm or more, the average of the aspect ratios (average aspect ratio) is preferably 1.33 or less. The aspect ratio is the ratio (long diameter/short diameter) of the long diameter (maximum length) of the particle to the short diameter (maximum length vertical diameter) thereof. The long diameter of a particle is the maximum distance between two points on the projected contour line of the particle as measured from an enlarged image of the fine silicon particles. The short diameter of a particle is the distance between two straight lines parallel with respect to the long diameter, which interpose the particle therebetween. The average aspect ratio is the average of the aspect ratios of 10000 particles.

Furthermore, particles with a particle diameter of 1 μm or more preferably have an average degree of unevenness (average degree of unevenness) determined in accordance with Formula (2) of 0.96 or more. In Formula (2), the particle envelope peripheral length is the length of the periphery of a figure formed by the shortest connections between convexities of the particle as measured from the enlarged image of the fine silicon particles. The average degree of unevenness is the average of the degree of unevenness of 10000 particles.

$$\text{Degree of unevenness} = \text{Envelope peripheral length of particles} / \text{peripheral length of particles} \quad (2)$$

Furthermore, the fine silicon particles preferably have a residual strain of 0.0300% or more.

Next, a detailed description will be given of each of the above properties of the fine silicon particles.

(Average Particle Diameter)

When the average particle diameter of the fine silicon particles is excessively small, there is a concern that the fine silicon particles may easily agglomerate to form coarse particles. On the other hand, when the average particle diameter is excessively large, there is a concern that the composition of the particle mixture obtained by mixing with other raw material particles may easily become non-uniform. For this reason, in the present embodiment, the average particle diameter based on volume, which is measured by the laser diffraction scattering method, is set in a range of 0.8 μm or more and 8.0 μm or less and the average particle diameter based on number, which is measured by the laser diffraction scattering method, is set in a range of 0.100 μm or more and 0.150 μm or less. The average particle diameter based on volume is preferably in a range of 0.9 μm or more and 5.0 μm or less and particularly preferably in a range of 0.9 μm or more and 3.0 μm or less. The average particle diameter based on number is preferably in a range of 0.100 μm or more and 0.145 μm or less and particularly preferably in a range of 0.100 μm or more and 0.140 μm or less.

(D10, D50, D90)

The relatively tiny particles included in the fine silicon particles have a narrower particle diameter distribution range and, the more uniform the particle diameter, the more the fluidity of the fine silicon particles is improved. In addition, for the relatively coarse particles included in the fine silicon particles, the wider the particle diameter distribution range, the greater the filling ratio of the fine silicon particles with respect to the space. For this reason, in the present embodiment, in a particle size distribution based on volume, which is measured by the laser diffraction scattering method, preferably, setting is carried out such that a particle diameter D10 with a cumulative frequency of 10% by volume is 0.160 μm or less, a particle diameter D50 with a cumulative frequency of 50% by volume is 0.600 μm or less, and a particle diameter D90 with a cumulative frequency of 90% by volume is 20 μm or less. A narrower interval between D10 and D50 is preferable. That is, the ratio of D10 to D50 (D10/D50 ratio) is preferably 0.26 or more and particularly preferably 0.30 or more. In addition, a wider interval between D50 and D90 is preferable. That is, the ratio of D90 to D50 (D90/D50 ratio) is preferably 10 or more and particularly preferably 15 or more.

(Specific Surface Area)

When the specific surface area measured by the BET method becomes excessively small, there is a concern that the reactivity of the fine silicon particles may decrease, such that, for example, the reaction rate may be slowed when a silicide-based thermoelectric material is produced by sintering the particle mixture, or the composition of the obtained silicide-based thermoelectric material may become non-uniform. On the other hand, when the specific surface area is excessively large, there is a concern that the fine silicon particles may agglomerate to easily form coarse particles due to an increase in the contact area between the fine silicon particles. For this reason, in the present embodiment, the specific surface area is set in a range of 4.0 $m^2/g$ or more and 10 $m^2/g$ or less. The specific surface area is preferably in a range of 5.0 $m^2/g$ or more and 8.0 $m^2/g$ or less and particularly preferably in a range of 5.5 $m^2/g$ or more and 8.0 $m^2/g$ or less.

(Average Circularity)

When the average circularity becomes excessively small, there is a concern that the fluidity of the fine silicon particles may be reduced to decrease the dispersibility when mixed with other raw material particles. For this reason, in the present embodiment, the average circularity is set to 0.93 or more. The average circularity is preferably 0.94 or more and particularly preferably 0.95 or more. The average circularity is preferably 0.99 or less. In addition, the average circularity preferably has a standard deviation of 0.070 or less. By setting the standard deviation as small as 0.070, the fine silicon particles become an agglomerate of uniformly shaped particles that are close to a spherical shape, thus, the dispersibility is further improved.

(Average Aspect Ratio)

When the average aspect ratio becomes excessively large, there is a concern that the fine silicon particles may become entangled with each other when mixed with other raw material particles, such that the fluidity is decreased, thereby decreasing the dispersibility. For this reason, in the present embodiment, the average aspect ratio is preferably set to 1.33 or less. The average aspect ratio is preferably 1.28 or less and particularly preferably 1.27 or less. In addition, the average aspect ratio preferably has a standard deviation of 0.055 or less. By setting the standard deviation as small as 0.055 or less, the fine silicon particles become an agglomerate of particles with a uniform particle shape, thus, the dispersibility is further improved.

(Average Degree of Unevenness)

When the average degree of unevenness becomes excessively small, there is a concern that the contact area between the fine silicon particles may increase and that coarse agglomerated particles may be easily formed. For this reason, in the present embodiment, the average degree of unevenness is preferably set to 0.96 or more. The average degree of unevenness is preferably 0.97 or more and particularly preferably 0.98 or more. In addition, the average degree of unevenness preferably has a standard deviation of 0.140 or less. By setting the standard deviation as small as 0.140, the fine silicon particles become particles with a flat surface and uniform shape, thus, agglomerated particles are less likely to form.

(Residual Strain)

When the residual strain of the fine silicon particles becomes excessively low, for example, when a silicide-based thermoelectric material is produced by sintering the particle mixture, there is a concern that it may be difficult for other raw materials to diffuse into the Si fine particles and difficult to obtain a silicide-based thermoelectric material with a uniform composition. For this reason, in the present embodiment, the residual strain is preferably set to 0.0300% or more. The residual strain is preferably 0.0400% or more and particularly preferably 0.0500% or more.

The fine silicon particles of the present embodiment are not limited in purity and may be fine particles of low-purity silicon, fine particles of high-purity silicon, or fine particles of a semiconductive silicon including a dopant. Low-purity silicon has a purity of 98% by mass to less than 99.999% by mass. High-purity silicon preferably has a purity of 99.999% by mass (5N) or more, more preferably 99.9999% by mass (6N) or more, and even more preferably 99.9999999% by mass (9N) or more. Semiconductive silicon has a higher strength than high-purity silicon due to the solid solution effect of dopants. Semiconductive silicon includes P-type semiconductive silicon and N-type semiconductive silicon. Examples of P-type semiconductive silicon include semiconductive silicon doped with boron and aluminum. Examples of N-type semiconductive silicon include semiconductive silicon doped with nitrogen, phosphorus, arsenic, antimony, and bismuth.

According to the fine silicon particles of the present embodiment configured as described above, the volume-based and average particle diameter based on numbers, which are measured by the laser diffraction scattering method, the specific surface area as measured by the BET method, and the average circularity of particles with a particle diameter of 1 μm or more are set in the ranges described above, thus, tiny and coarse agglomerated particles are less likely to be formed and the dispersibility when mixed with other raw material particles is high. For this reason, by mixing the fine silicon particles of the present embodiment with other raw material particles, it is possible to obtain a particle mixture in which the fine silicon particles are uniformly dispersed as primary particles or tiny agglomerated particles close thereto.

In addition, the fine silicon particles of the present embodiment have a particle size distribution with a narrow particle diameter distribution range for relatively tiny particles and a wide particle diameter distribution range for relatively large particles due to D10, D50, and D90 being in the ranges described above, thus, the dispersibility and filling properties are improved. Furthermore, the average aspect ratio of particles with a particle diameter of 1 μm or more being in the range described above suppresses the entanglement of the fine silicon particles with each other, thus, the dispersibility of the fine silicon particles is further improved when mixed with other raw material particles. Furthermore, by the average degree of unevenness of particles with a particle diameter of 1 μm or more being in the range described above, the contact area of the fine silicon particles with each other is reduced and coarse agglomerated particles are less likely to form, thus, it is possible to more uniformly disperse the fine silicon particles as primary particles or tiny agglomerated particles close thereto in a particle mixture with other raw material particles. Furthermore, with the residual strain in the range described above, by carrying out mixing with other raw materials and sintering, the other raw materials are easily diffused into the Si fine particles and the composition uniformity in the obtained sintered product is high.

[Method for Producing Fine Silicon Powder]

FIG. 1 shows the flow of a method for producing fine silicon particles according to one embodiment of the present invention.

As shown in FIG. 1, the method for producing fine silicon powder of the present embodiment includes a crushing step S10, a coarse milling step S11, and a milling step S12.

(Crushing Step)

The crushing step S10 is a step of crushing silicon lumps to obtain a crushed silicon material.

The size of the silicon lumps is not particularly limited. The shape of the silicon lumps is not particularly limited and may be, for example, columnar, plate-like, or granular. As the silicon lumps, it is possible to use silicon chunks, polycrystalline silicon other than chunks, lumps of monocrystalline silicon and columnar silicon ingots, silicon monitor wafers, silicon dummy wafers, and granular silicon.

The crushing apparatus for crushing silicon lumps is not particularly limited and it is possible to use, for example, hammer crushers, jaw crushers, gyratory crushers, cone crushers, roll crushers, and impact crushers.

The size of the crushed silicon material obtained by crushing silicon lumps preferably has a longest diameter in a range of more than 1 mm and 5 mm or less.

(Coarse Milling Step)

The coarse milling step S11 is a step of coarsely milling a crushed silicon material to obtain coarse silicon particles. The coarse silicon particles obtained in the coarse milling step S11 preferably have a maximum particle diameter of 1000 μm or less as sorted by the sieve method. For this reason, the coarse milling step S11 preferably includes a step of classifying the coarse milled material obtained by coarse milling using a sieve having a mesh aperture of 1000 μm to recover coarse particles with a maximum particle diameter of 1000 μm or less. When the size of coarse silicon particles exceeds 1000 μm, there is a concern that the coarse silicon particles may not be sufficiently milled in the next milling step S12 and coarse silicon particles may be mixed with the obtained fine silicon particles. The maximum particle diameter of the coarse silicon particles is particularly preferably 500 μm or less.

The coarse milling may be performed by either dry methods or wet methods, but dry methods are preferable. The milling apparatus used for the coarse milling of the crushed silicon material is not particularly limited and it is possible to use ball mills (planetary ball mills, vibrating ball mills, rolling ball mills, and agitating ball mills), jet mills, and three-dimensional ball mills.

(Milling Step)

The milling step S12 is a step of milling coarse silicon particles to obtain fine silicon particles.

In the milling step S12, a three-dimensional ball mill is used as the milling apparatus.

A three-dimensional ball mill is an apparatus including a first shaft centered on a first shaft core, a first rotator attached to the first shaft so as to rotate around the first shaft core, a second shaft attached to the first rotator, extending in a direction different from that of the first shaft core, and centering on a second shaft core, a second rotator attached to the second shaft so as to rotate around the first shaft core, a spherical container rotating together with the second rotator, and a driving apparatus for rotating the first rotator and the second rotator. In the three-dimensional ball mill, the spherical container is filled with coarse silicon particles and hard balls and the spherical container is rotated using the first rotator and second rotator to mill the coarse silicon particles. In the three-dimensional ball mill, the spherical container rotates around the first shaft core while rotating around the second shaft core to perform three-dimensional rotation. Due to the three-dimensional rotation of the spherical container, the coarse silicon particles and the hard balls filled in the spherical container repeat complex motions, thus, it is possible to carry out the milling of the coarse silicon particles more efficiently. As the three-dimensional ball mill, it is possible to use a mill sold by Nagao System Inc.

As the hard balls, it is possible to use Zirconia ($ZrO_2$) balls or alumina ($Al_2O_3$) balls. The particle diameter of the hard balls is preferably in a range of 1 mm or more and 10 mm or less. When the particle diameter of the hard balls is in this range, it is possible to efficiently mill the coarse silicon particles. The amount of hard balls used is preferably in a range of 500 parts by mass or more and 2500 parts by mass or less with respect to 100 parts by mass of coarse silicon particles. When the amount of hard balls to be used is in this range, it is possible to efficiently mill the coarse silicon particles. The amount of hard balls to be used is preferably in a range of 1000 parts by mass or more and 2000 parts by mass or less and particularly preferably in a range of 1100 parts by mass or more and 1500 parts by mass or less.

The filling ratio of coarse silicon particles and hard balls in the spherical container is preferably in a range of 3% or more and 35% or less as the amount of the total volume of coarse silicon particles and hard balls with respect to the capacity of the spherical container. When the filling ratio is excessively small, there is a concern that the milling efficiency may decrease and the production cost may increase. On the other hand, when the filling ratio is excessively large, there is a concern that it may be difficult for the milling to proceed, the average particle diameter of the obtained fine silicon particles may become larger, or the coarse silicon particles may not be sufficiently milled, such that coarse silicon particles remain. The filling ratio of the coarse silicon particles and hard balls is preferably in a range of 15% or more to 30% or less and particularly preferably in a range of 20% or more and 30% or less. The filling ratio is the volume assuming 100% is when the inside of the spherical container is filled without gaps between the raw materials and balls. For example, the filling ratio is 50% if half of the spherical container is filled with raw material and hard balls without gaps and the filling ratio is 15.6% if ½ the height of the spherical container is filled with raw material and hard balls without gaps.

The spherical container is preferably filled with a non-oxidizing gas. By using spherical containers filled with a non-oxidizing gas, it is possible to suppress particle agglomeration and oxidation of the fine silicon particles due to moisture absorption of the fine silicon particles. It is possible to use argon, nitrogen, and carbon dioxide as the non-oxidizing gas.

In the method for producing fine silicon particles of the present embodiment, in the coarse milling step S11, coarse silicon particles with a maximum particle diameter of 1000 μm or less as measured by the sieve method are prepared and, in the following milling step S12, the coarse silicon particles are milled under predetermined conditions using a three-dimensional ball mill. For this reason, it is possible to industrially produce, in an advantageous manner, fine silicon particles that are tiny, that are less likely to form coarse agglomerated particles, and that have high dispersibility when mixed with other raw material particles.

In the milling step of the method for producing fine silicon particles of the present embodiment, the milling time is 0.5 hours or more, preferably 1 hour or more, more preferably 3.5 hours or more, and particularly preferably 5 hours or more.

EXAMPLES

Example 1 of the Present Invention (1) Production of Crushed Silicon Material Scale-shaped polycrystalline silicon chunks (purity: 99.999999999% by mass, length: 5 to 15 mm, width: 5 to 15 mm, thickness: 2 to 10 mm) were crushed using a hammer mill. Next, the obtained milled material was then dry classified using a sieve with 5 mm apertures to obtain the crushed silicon material under the sieve.

(2) Production of Coarse Silicon Particles

The obtained crushed silicon material, hard balls (zirconia balls, diameter: 10 mm), and a spherical container (80 mm diameter spherical container formed of two hemispherical containers) were each accommodated in a glove box filled with Ar gas. In the glove box, 30 parts by mass of the crushed silicon material and 380 parts by mass of hard balls were introduced into one of the hemispherical containers. Next, the hemispherical container into which the crushed silicon material and hard balls were introduced was combined with the other hemispherical container to form a spherical container (the spherical container) and the two hemispherical containers were screwed together and sealed in the glove box filled with Ar gas. The filling ratio of the crushed silicon material and the hard balls in the spherical container was 28%.

The spherical container filled with the crushed silicon material and hard balls was taken out from the glove box and set in a three-dimensional ball mill apparatus. Then, coarse milling was performed under the conditions of a rotational speed of the first rotator of 300 rpm, a rotational speed of the second rotator of 300 rpm, and a milling time of 0.33 hours. After coarse milling, the coarse silicon milled material and hard balls were dry classified using a sieve with 1000 μm apertures to obtain coarse silicon particles with a maximum particle diameter of 1000 μm or less.

(3) Production of Fine Silicon Particles

The coarse silicon particles obtained in (2) described above, hard balls (zirconia balls, diameter: 10 mm), and a spherical container (80 mm diameter spherical container consisting of two hemispherical containers) were each accommodated in a glove box filled with Ar gas. Next, in the glove box, 15 parts by mass of the crushed silicon material and 200 parts by mass of the hard balls were introduced into one of the hemispherical containers (the amount of hard balls with respect to 100 parts by mass of coarse silicon particles was 1333 parts by mass). Next, the hemispherical container into which the crushed silicon material and hard balls were introduced was combined with the other hemispherical container to form a spherical container (the spherical container) and the two hemispherical containers were screwed together and sealed in the glove box filled with Ar gas. The filling ratio of the crushed silicon material and the hard balls in the spherical container was 15%.

The spherical container filled with coarse silicon particles and hard balls was taken out from the glove box and set in the three-dimensional ball mill apparatus. Then, milling was performed under the conditions of a rotational speed of the first rotator of 300 rpm, a rotational speed of the second rotator of 300 rpm, and a milling time of one hour to obtain fine silicon particles.

(4) Production of $Mg_2Si$ Particles

The fine silicon particles obtained in (3) described above and magnesium particles (purity: 99.5% by mass, particle diameter: 180 μm-pass, manufactured by High Purity Materials Kojundo Chemical Laboratory Co., Ltd.) were weighed to obtain a ratio of 1:2.05 (=Si:Mg) by molar ratio. Increasing the ratio of Mg from the stoichiometric composition is to prevent deviation from the stoichiometric composition accompanying the evaporation of Mg caused by heating during alloying ($Mg_2Si$ formation) and sintering due to the high vapor pressure of Mg. Furthermore, to make N-type semiconductive silicon, antimony particles (purity: 99.9% by mass, particle diameter: 45 μm-pass) were weighed to obtain a molar ratio of 0.5 at %. The weighed fine silicon particles, magnesium particles, and antimony particles were mixed using a 3D ball mill or a mortar and pestle to obtain a particle mixture. The obtained particle mixture was sintered under conditions of being held at 670° C. for one minute using an electroconductive heating apparatus to obtain an $Mg_2Si$ ingot. Next, the obtained $Mg_2Si$ ingot was milled to produce $Mg_2Si$ particles doped with Sb.

Examples 2 to 11 of the Present Invention, Comparative Examples 1 to 6

Fine silicon particles and $Mg_2Si$ particles were produced in the same manner as in Example 1 of the present invention, except that in the production of the fine silicon particles of (3) described above, the particle diameter and blending amount of the coarse silicon particles, the particle diameter and blending amount of the hard balls, and the milling time were changed to the conditions shown in Table 1 described below.

[Evaluation]

(1) Evaluation of Fine Silicon Particles

Figure 2:
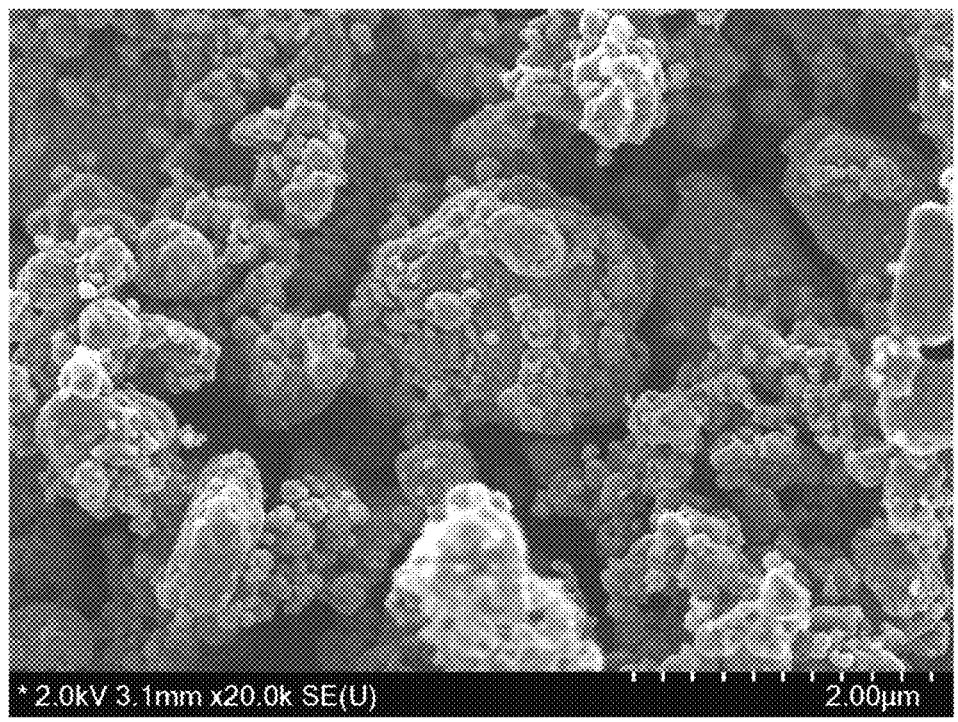
FIG. 2 is an enlarged photograph of fine silicon particles obtained in Example 4 of the present invention.
Figure 3:
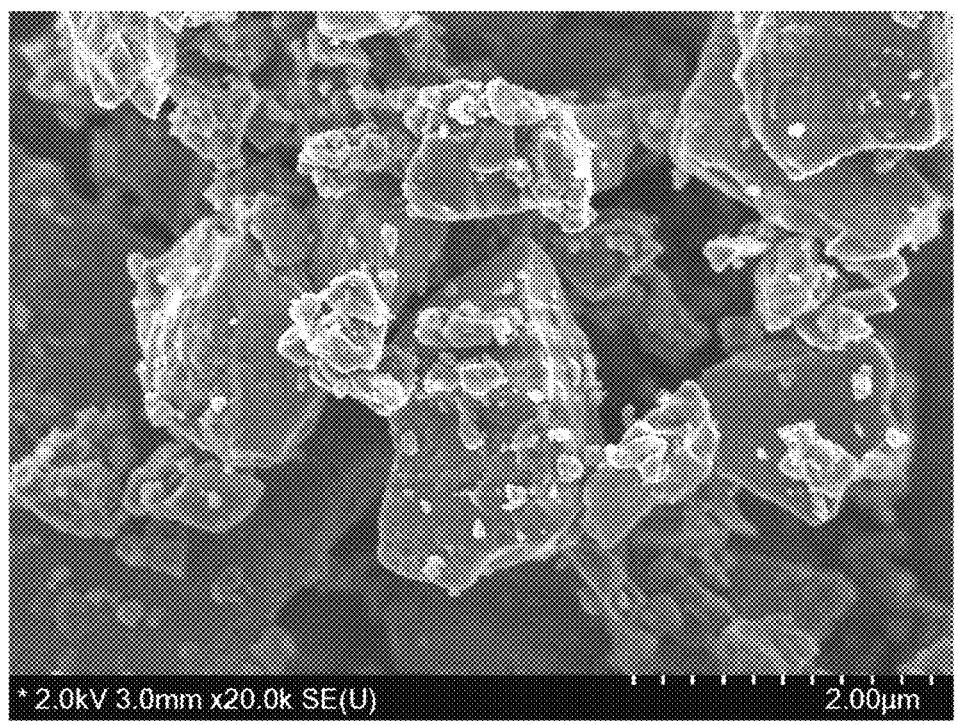
FIG. 3 is an enlarged photograph of fine silicon particles obtained in Comparative Example 4.
Figure 4:
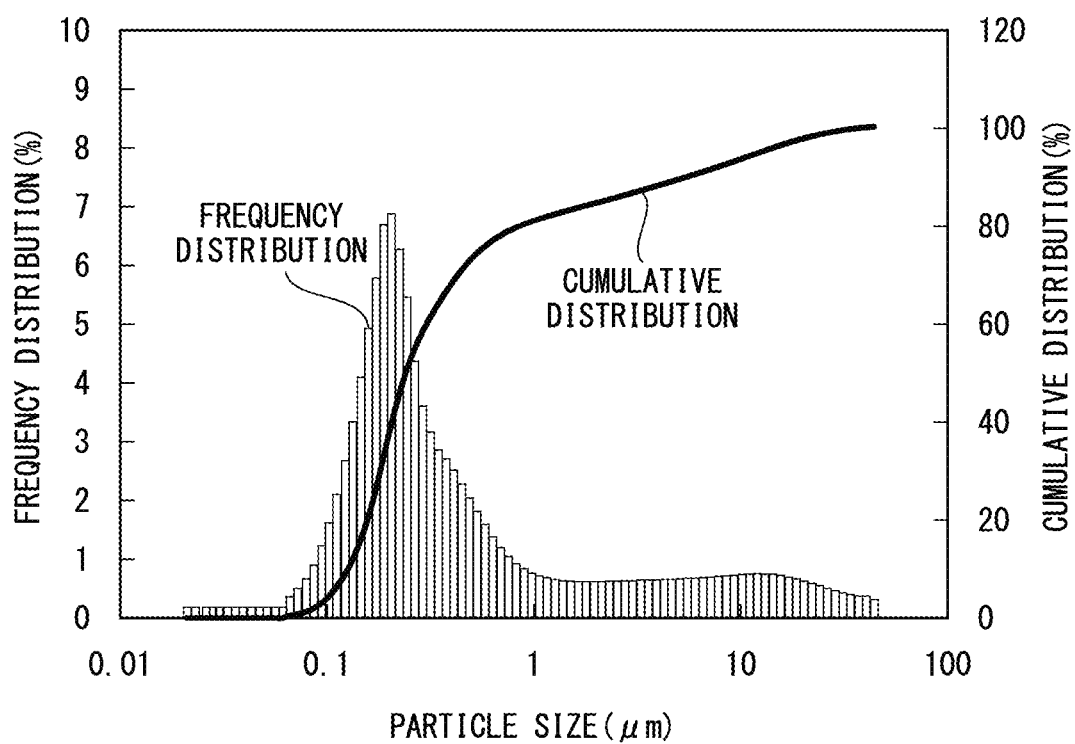
FIG. 4 is a particle size distribution based on volume of fine silicon particles obtained in Example 1 of the present invention, which is measured by the laser diffraction scattering method.

For the fine silicon particles obtained in the Examples 1 to 11 of the present invention and Comparative Examples 1 to 6, the specific surface area, particle size distribution, shape (circularity, aspect ratio, and unevenness), and residual strain were measured by the following methods. The measurement results are shown in Table 2 below. In addition, an enlarged photograph of fine silicon particles obtained in Example 4 of the present invention and an enlarged photograph of fine silicon particles obtained in Comparative Example 4 are shown in FIG. 2 and FIG. 3, respectively. Furthermore, the particle size distribution based on volume of the fine silicon particles obtained in Example 4 of the present invention, which was measured by the laser diffraction scattering method, is shown in FIG. 4.

(Method for Measuring Specific Surface Area)

The fine silicon particles of the specimen were placed in a measuring cell, the inside of the cell was degassed under the conditions of a degassing time of 60 minutes and a degassing temperature of 200° C. and then the specific surface area was measured by the BET method using a fully automatic gas adsorption volume measuring apparatus (AUTOSORB-iQ2, manufactured by Quantachrome Corporation). Nitrogen gas was used as the measurement gas.

(Method for Measuring Particle Size Distribution)

The fine silicon particles of the specimen were ground using a mortar and pestle. The ground fine silicon particles were introduced into a surfactant aqueous solution and the fine silicon particles were dispersed by an ultrasonic treatment to prepare a fine silicon particle dispersion solution. Next, the particle size distribution of the fine silicon particles in the obtained fine silicon particle dispersion solution was measured using a laser diffraction and scattering-type particle diameter distribution measurement apparatus (MT3300EX II, manufactured by Microtrac Bell Corporation). From the obtained particle size distribution, the average particle diameter based on volume, the average particle diameter based on number, the minimum particle diameter, the maximum particle diameter, D10, D50, and D90 were calculated and shown in Table 2, respectively.

(Method for Measuring Shape)

The fine silicon particles of the specimen were dispersed on a glass plate using a powder dispersion unit and the fine silicon particles were captured with a 50× objective lens. Using image analysis software, the circularity, aspect ratio, and unevenness were measured for 10,000 fine silicon particles with a particle diameter of 1 μm or more and the average and standard deviation thereof were calculated. The apparatus used was a Morphologi G3 manufactured by Malvern Panalytical.

(Method for Measuring Residual Strain)

The residual strain was measured by analyzing an X-ray diffraction pattern. For the measurement of the X-ray diffraction pattern, powder X-ray diffraction was used and, for the analysis, the Whole Powder Pattern Fitting (WPPF) method was used. The apparatus used for the measurement of the X-ray diffraction patterns was the D8 ADVANCE manufactured by Bruker AXS and the software used for the analysis was Rigaku PDXL2.

(2) Evaluation of $Mg_2Si$ Particles

The composition uniformity of the $Mg_2Si$ particles obtained in Examples 1 to 11 of the present invention and Comparative Examples 1 to 6 was measured by the following method. The thermoelectric characteristics of the $Mg_2Si$ particles were also evaluated by the following method.

(Method for Measuring Composition Uniformity)

For the measurement of composition uniformity, ten arbitrary particles of $Mg_2Si$ sintered materials were selected and the Mg and Si in the central portion of the individual particles were quantitatively analyzed using EPMA (Electron Probe Micro Analyzer: JXA-8800RL, manufactured by JEOL). The ratio (Mg/Si ratio) of Mg to Si quantified for each specimen was calculated and the average value thereof was determined. The measurement conditions were an acceleration voltage of 15 kV, a current of 50 nA, and a beam diameter of 1 μm.

A case where the average value of the Mg/Si ratio was in a range of 2.00±0.03 was set as "A", a case where Mg/Si was in a range of 1.92 or more and less than 1.97, or in a range of 2.03 or more and 2.08 or less, was set as "B", and a case where Mg/Si was less than 1.92 or in excess of 2.08 was set as "C".

(Method for Evaluating Thermoelectric Characteristics)

A sintered material of $Mg_2Si$ particles was produced and the power factor of the obtained $Mg_2Si$ sintered material was evaluated.

The $Mg_2Si$ sintered material was produced as follows.

$Mg_2Si$ particles were filled into a carbon mold of which an inner side was covered with a carbon sheet. Next, production was carried out by pressure-sintering the $Mg_2Si$ particles filled in the carbon mold using an electroconductive heating apparatus under the conditions of a sintering temperature of 950° C., a pressurizing force of 30 MPa, and a holding time of one minute.

The power factor of the $Mg_2Si$ sintered material was measured as follows.

The Seebeck coefficient and electrical conductivity of the $Mg_2Si$ sintered material were measured in the temperature range from room temperature to 550° C. using a ZEM-3 manufactured by Advance Riko, Inc.

The power factor (PF) at 400° C. was calculated from the following equation.

$$PF=S^2\sigma$$

Here, S represents the Seebeck coefficient (V/K) and σ represents electrical conductivity (S/m).

TABLE 1

| | Coarse silicon particles | | Hard balls | | Amount of hard balls with respect to 100 parts by mass of coarse silicon particles (parts by mass) | Total filling ratio of coarse silicon particles and hard balls in spherical container (%) | Milling time (hours) |
| --- | --- | --- | --- | --- | --- | --- | --- |
| | Maximum particle diameter (μm) | Blending amount (parts by mass) | Ball diameter (mm) | Blending amount (parts by mass) | | | |
| Example 1 | 1000 or less | 15 | 10 | 200 | 1333 | 15 | 1 |
| Example 2 | 1000 or less | 15 | 10 | 200 | 1333 | 15 | 3 |
| Example 3 | 1000 or less | 15 | 10 | 200 | 1333 | 15 | 6 |
| Example 4 | 1000 or less | 15 | 10 | 200 | 1333 | 15 | 10 |
| Example 5 | 5000 or less | 15 | 10 | 200 | 1333 | 28 | 10 |
| Example 6 | 1000 or less | 6 | 10 | 75 | 1250 | 6 | 6 |
| Example 7 | 1000 or less | 20 | 10 | 270 | 1350 | 20 | 6 |
| Example 8 | 250 or less | 15 | 10 | 200 | 1333 | 15 | 6 |
| Example 9 | 500 or less | 15 | 10 | 200 | 1333 | 15 | 6 |
| Example 10 | 500 or less | 15 | 5 | 200 | 1333 | 15 | 6 |
| Example 11 | 500 or less | 15 | 1 | 200 | 1333 | 15 | 6 |
| Comparative Example 1 | 5000 or less | 15 | 10 | 200 | 1333 | 15 | 0.5 |
| Comparative Example 2 | 2000 or less | 15 | 10 | 200 | 1333 | 15 | 0.5 |
| Comparative Example 3 | 1000 or less | 40 | 10 | 520 | 1300 | 39 | 6 |
| Comparative Example 4 | 1000 or less | 15 | 10 | 200 | 1333 | 15 | 0.33 |
| Comparative Example 5 | 1000 or less | 15 | 0.5 | 200 | 1333 | 15 | 6 |
| Comparative Example 6 | 1000 or less | 15 | 20 | 200 | 1333 | 15 | 6 |

TABLE 2

| | Specific surface area (m²/g) | Average particle diameter based on volume (μm) | Average particle diameter based on number (μm) | Minimum particle diameter (μm) | Maximum particle diameter (μm) | D10 (μm) | D50 (μm) | D90 (μm) |
|---|---|---|---|---|---|---|---|---|
| Example 1 | 4.92 | 3.575 | 0.148 | 0.080 | 62.230 | 0.151 | 0.382 | 11.717 |
| Example 2 | 6.18 | 2.700 | 0.140 | 0.066 | 58.930 | 0.140 | 0.310 | 8.300 |
| Example 3 | 6.25 | 2.743 | 0.147 | 0.079 | 46.780 | 0.150 | 0.400 | 8.700 |
| Example 4 | 7.23 | 1.522 | 0.133 | 0.066 | 31.110 | 0.127 | 0.242 | 4.234 |
| Example 5 | 6.02 | 2.036 | 0.133 | 0.066 | 44.000 | 0.129 | 0.247 | 5.944 |
| Example 6 | 7.14 | 1.746 | 0.132 | 0.066 | 37.000 | 0.127 | 0.240 | 4.929 |
| Example 7 | 6.87 | 2.180 | 0.135 | 0.070 | 58.930 | 0.136 | 0.313 | 4.851 |
| Example 8 | 7.94 | 2.186 | 0.137 | 0.066 | 44.000 | 0.138 | 0.304 | 6.651 |
| Example 9 | 7.46 | 2.482 | 0.137 | 0.070 | 55.630 | 0.136 | 0.298 | 7.301 |
| Example 10 | 6.03 | 1.605 | 0.133 | 0.066 | 33.400 | 0.127 | 0.244 | 4.610 |
| Example 11 | 5.84 | 0.978 | 0.130 | 0.066 | 13.900 | 0.124 | 0.238 | 4.623 |
| Comparative Example 1 | 2.98 | 51.100 | 0.360 | 0.330 | 418.600 | 3.270 | 36.360 | 111.630 |
| Comparative Example 2 | 3.01 | 40.070 | 0.372 | 0.270 | 352.000 | 3.363 | 27.653 | 88.590 |
| Comparative Example 3 | 3.47 | 8.450 | 0.181 | 0.094 | 108.000 | 0.208 | 3.220 | 21.623 |
| Comparative Example 4 | 3.27 | 13.943 | 0.342 | 0.220 | 134.860 | 0.563 | 11.403 | 27.833 |
| Comparative Example 5 | 3.91 | 12.200 | 0.154 | 0.079 | 206.700 | 0.173 | 0.714 | 39.960 |
| Comparative Example 6 | 3.42 | 9.875 | 0.188 | 0.105 | 93.567 | 0.211 | 3.951 | 27.303 |

| | Circularity (—) | | Aspect ratio (—) | | Unevenness (—) | | Residual strain (%) |
|---|---|---|---|---|---|---|---|
| | Average | Standard deviation | Average | Standard deviation | Average | Standard deviation | |
| Example 1 | 0.952 | 0.050 | 1.266 | 0.027 | 0.990 | 0.116 | 0.0313 |
| Example 2 | 0.955 | 0.044 | 1.241 | 0.02 | 0.992 | 0.112 | 0.0408 |
| Example 3 | 0.935 | 0.065 | 1.305 | 0.037 | 0.984 | 0.139 | 0.0486 |
| Example 4 | 0.953 | 0.055 | 1.239 | 0.029 | 0.990 | 0.118 | 0.0563 |
| Example 5 | 0.956 | 0.053 | 1.256 | 0.051 | 0.987 | 0.133 | 0.0577 |
| Example 6 | 0.955 | 0.055 | 1.233 | 0.046 | 0.989 | 0.108 | 0.0503 |
| Example 7 | 0.952 | 0.051 | 1.248 | 0.022 | 0.994 | 0.124 | 0.0497 |
| Example 8 | 0.959 | 0.049 | 1.214 | 0.021 | 0.995 | 0.106 | 0.0499 |
| Example 9 | 0.954 | 0.047 | 1.242 | 0.019 | 0.996 | 0.122 | 0.0489 |
| Example 10 | 0.952 | 0.051 | 1.252 | 0.024 | 0.992 | 0.131 | 0.0482 |
| Example 11 | 0.957 | 0.045 | 1.256 | 0.02 | 0.993 | 0.130 | 0.0453 |
| Comparative Example 1 | 0.850 | 0.096 | 1.437 | 0.079 | 0.915 | 0.155 | 0.0137 |
| Comparative Example 2 | 0.881 | 0.085 | 1.427 | 0.06 | 0.948 | 0.150 | 0.0125 |
| Comparative Example 3 | 0.903 | 0.081 | 1.342 | 0.077 | 0.906 | 0.142 | 0.0256 |
| Comparative Example 4 | 0.926 | 0.075 | 1.408 | 0.063 | 0.952 | 0.149 | 0.0154 |
| Comparative Example 5 | 0.925 | 0.079 | 1.368 | 0.081 | 0.912 | 0.142 | 0.0199 |
| Comparative Example 6 | 0.899 | 0.087 | 1.429 | 0.068 | 0.936 | 0.152 | 0.0294 |

TABLE 3

| | Composition Uniformity | Power factor (×10⁻³ W/mK2) at 400° C. |
|---|---|---|
| Example 1 | B | 3.18 |
| Example 2 | B | 3.10 |
| Example 3 | A | 3.21 |
| Example 4 | A | 3.23 |
| Example 5 | A | 3.19 |
| Example 6 | A | 3.30 |
| Example 7 | A | 3.29 |
| Example 8 | A | 3.34 |
| Example 9 | A | 3.31 |
| Example 10 | A | 3.29 |
| Example 11 | B | 3.23 |
| Comparative Example 1 | C | 2.48 |
| Comparative Example 2 | C | 2.51 |
| Comparative Example 3 | C | 2.72 |
| Comparative Example 4 | C | 2.59 |

TABLE 3-continued

|  | Composition Uniformity | Power factor (×10⁻³ W/mK2 at 400° C.) |
|---|---|---|
| Comparative Example 5 | C | 2.53 |
| Comparative Example 6 | C | 2.64 |

It is clear that, for the fine silicon particles obtained in Examples 1 to 11 of the present invention, where the maximum particle diameter of the coarse silicon particles, the ball diameter of the hard balls, the filling ratio of coarse silicon particles and hard balls in the spherical container, and the milling time are in the ranges of the present invention, the volume-based and average particle diameter based on number, specific surface area, and average circularity are in the ranges of the present invention. In contrast, for the fine silicon particles obtained in Comparative Examples 1 and 2, where the maximum particle diameter and milling time of the coarse silicon particles are outside of the ranges of the present invention, in Comparative Example 3, where the total filling ratio of coarse silicon particles and hard balls in the spherical container is outside of the range of the present invention, in Comparative Example 4, where the milling time is outside of the range of the present invention, and in Comparative Examples 5 and 6, where the ball diameter of the hard balls is outside of the ranges of the present invention, the volume-based and average particle diameter based on number, specific surface area, and average circularity are outside of the range of the present invention.

Comparing the SEM photograph in FIG. 2 with the SEM photograph in FIG. 3, it was clear that, for the fine silicon particles obtained in Example 4 of the present invention, the particles with a particle diameter of 1 µm or more are not angular and are closer to spherical in shape than the fine silicon particles obtained in Comparative Example 4. In addition, from the particle size distribution in FIG. 4, it was clear that the fine silicon particles obtained in Example 4 of the present invention have a narrow particle diameter range from D10 (0.127 µm) to D50 (0.242 µm) and the relatively tiny particles are uniform in the particle diameter. In addition, it was clear that the range of particle diameters from D50 (0.242 µm) to D90 (4.234 µm) was wide and the relatively coarse particles have a wide particle diameter distribution range.

It was clear that the $Mg_2Si$ sintered materials produced using the fine silicon particles of Examples 1 to 11 of the present invention, in which the volume-based and average particle diameter based on number, specific surface area, and average circularity were in the ranges of the present invention, have a high power factor and excellent thermoelectric characteristics. In contrast, it was clear that the $Mg_2Si$ sintered materials produced using the fine silicon particles of Comparative Examples 1 to 6, in which the volume-based and average particle diameter based on number, specific surface area, and average circularity are outside of the range of the present invention, had a low power factor and inferior thermoelectric characteristics.

INDUSTRIAL APPLICABILITY

The fine silicon particles of the present embodiment are tiny, less likely to form coarse agglomerated particles, and have high dispersibility when mixed with other raw material particles. For this reason, it is possible to use, in an advantageous manner, the fine silicon particles of the present embodiment as a Si raw material for silicide-based thermoelectric materials such as $Mg_2Si$. In addition, it is also possible to use the fine silicon particles of the present embodiment as a negative-electrode active material for lithium-ion secondary batteries, a silicide target raw material, and a material for luminescent materials.

What is claimed is:

1. Fine silicon particles comprising:
   particles having a microscopically measured particle diameter of 1 µm or more,
   wherein an average particle diameter based on volume, which is measured by a laser diffraction scattering method, is in a range of 0.8 µm or more and 8.0 µm or less,
   in a particle size distribution based on volume, which is measured by the laser diffraction scattering method, a particle diameter D10 with a cumulative frequency of 10% by volume is 0.160 µm or less, a particle diameter D50 with a cumulative frequency of 50% by volume is 0.600 µm or less, and a particle diameter D90 with a cumulative frequency of 90% by volume is 20 µm or less,
   an average particle diameter based on number, which is measured by the laser diffraction scattering method, is in a range of 0.100 µm or more and 0.150 µm or less,
   a specific surface area, which is measured by a BET method, is in a range of 4.0 m²/g or more and 10 m²/g or less, and
   the particles having a microscopically measured particle diameter of 1 µm or more have an average circularity determined in accordance with Formula (1) of 0.93 or more,
   circularity=(4×π×projected area of particle)$^{1/2}$/peripheral length of particle (1).

2. The fine silicon particles according to claim 1, wherein the particles having a microscopically measured particle diameter of 1 µm or more have an average aspect ratio of 1.33 or less.

3. The fine silicon particles according to claim 1, wherein the particles having a microscopically measured particle diameter of 1 µm or more have an average degree of unevenness determined in accordance with Formula (2) of 0.96 or more,
   degree of unevenness=Envelope peripheral length of particles/peripheral length of particles (2).

4. The fine silicon particles according to claim 1, wherein a residual strain is 0.0300% or more.

* * * * *